(12) United States Patent
Gupta et al.

(10) Patent No.: US 10,795,027 B2
(45) Date of Patent: Oct. 6, 2020

(54) DEVICE, SYSTEM AND GLOBAL NAVIGATION SATELLITE SYSTEM METHOD USING LOCAL FINE TIME INFORMATION

(71) Applicant: Intel IP Corporation, Santa Clara, CA (US)

(72) Inventors: Raghvendra Gupta, Bangalore (IN); Rajshekhar Oruganti, Bangalore (IN)

(73) Assignee: Apple Inc., Cupertino, CA (US)

( * ) Notice: Subject to any disclaimer, the term of this patent is extended or adjusted under 35 U.S.C. 154(b) by 1035 days.

(21) Appl. No.: 14/879,231

(22) Filed: Oct. 9, 2015

(65) Prior Publication Data

US 2017/0102462 A1 Apr. 13, 2017

(51) Int. Cl.
*G01S 19/25* (2010.01)
*G01S 19/05* (2010.01)

(52) U.S. Cl.
CPC .......... *G01S 19/256* (2013.01); *G01S 19/05* (2013.01)

(58) Field of Classification Search
CPC ...... G01S 19/23; G01S 19/235; G01S 19/256; G01S 19/03; G01S 19/05
See application file for complete search history.

(56) References Cited

U.S. PATENT DOCUMENTS

| | | | | |
|---|---|---|---|---|
| 5,786,789 A * | 7/1998 | Janky | ................ | G01S 5/0027 342/357.4 |
| 6,246,959 B1 | 6/2001 | Nakajima | | |
| 6,295,023 B1 * | 9/2001 | Bloebaum | ............. | G01S 19/254 342/357.62 |
| 6,788,249 B1 * | 9/2004 | Farmer | ................ | G01S 5/0263 342/357.62 |
| 7,251,467 B2 * | 7/2007 | Sendonaris | .......... | H04B 1/3805 455/255 |
| 7,321,776 B2 * | 1/2008 | Camp, Jr. | ............. | G01S 19/256 342/357.64 |
| 7,327,310 B2 * | 2/2008 | Abraham | ............. | G01S 5/0036 342/357.4 |

(Continued)

OTHER PUBLICATIONS

"European Application Serial No. 16186002.8, Extended European Search Report dated Feb. 10, 2017", 9 pgs.

*Primary Examiner* — Gregory C. Issing
(74) *Attorney, Agent, or Firm* — Kowert, Hood, Munyon, Rankin & Goetzel, P.C.

(57) ABSTRACT

A user equipment (UE) and method of providing local fine timing assistance are generally described. Prior to storing a Global Navigation Satellite System (GNSS)-cellular time relationship in the UE and, when the network is unable to provide fine timing assistance, a GNSS receiver transmits a request to a modem. The modem, in response, periodically or as scheduled transmits a pulse and pulse timing information (PTI) including a pulse transmission time (PTT) based on cellular network time. The receiver determines a GNSS-cellular time relationship and obtains a GNSS satellite positioning signal and GNSS fix using the PTI. For pulses after the initial pulse, the PTI includes a time difference between the PTT and a PTT of the preceding pulse. The receiver determines a time difference between the PTT and GNSS fix. The modem is configured to terminate pulse transmission in response to receiving a termination request from the receiver.

29 Claims, 5 Drawing Sheets

(56) References Cited

U.S. PATENT DOCUMENTS

| | | | | |
|---|---|---|---|---|
| 8,437,693 B2* | 5/2013 | Brown | .................. | H04B 7/2693 |
| | | | | 342/358 |
| 8,482,460 B2* | 7/2013 | Jin | ........................ | G01S 19/235 |
| | | | | 342/357.59 |
| 9,151,844 B2* | 10/2015 | Syrjarinne | .............. | G01S 19/05 |
| 9,651,675 B2* | 5/2017 | Karaoguz | ................ | G01S 19/25 |
| 2011/0115670 A1* | 5/2011 | Abraham | .............. | G01S 19/235 |
| | | | | 342/357.29 |
| 2013/0035099 A1* | 2/2013 | Boejer | .................... | G01S 19/09 |
| | | | | 455/436 |
| 2014/0369389 A1 | 12/2014 | Sang et al. | | |

* cited by examiner

DEVICE, SYSTEM AND GLOBAL NAVIGATION SATELLITE SYSTEM METHOD USING LOCAL FINE TIME INFORMATION

TECHNICAL FIELD

Embodiments pertain to radio access networks. Some embodiments relate to use of a Global Navigation Satellite System (GNSS) in cellular networks.

BACKGROUND

The use of wireless communication devices and wireless communication networks has increased astronomically over the last several decades. This growth, until recently, was primarily spurred by the increased demand for mobile devices, in particular laptop and tablet computers and smartphones. User equipment (UE), in particular, Machine-Type Communication (MTC)-type devices used in the Internet of Things (IoT), has continued to drive demand for a wide variety of networked devices in a number of disparate environments networked using Third Generation Partnership Project Long Term Evolution (3GPP LTE) and LTE advanced (LTE-A) systems.

The variety of available applications and devices has led to an increased demand for location services, either for direct user benefit or for ad or other commercial-related interests. Location services are typically provided by the Global Positioning System (GPS), which is one of a number of existing GNSS systems. The GNSS systems use triangulation based on information received from multiple satellites in orbit. In particular, a UE receives navigation data from each satellite and converts the navigation data into position, velocity, and time estimates. The UE uses this information to calculate the satellite position and relative distance from the transmission time delay between when the signal was transmitted by the satellite and when the navigation data was received by the UE. To determine the position of the UE, the UE may combine the information.

However, weak GNSS satellite positioning signals may result in an increase in time-to-first-fix (TTFF) of UE positioning as well as a concomitant increase in power consumption as the UE searches for the GNSS satellite positioning signals. The search time may be decreased with accurate timing in the GNSS system, permitting faster discovery of the GNSS satellite positioning signals. It would therefore be desirable to generate GNSS timing having a finer degree of granularity.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION OF THE INVENTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
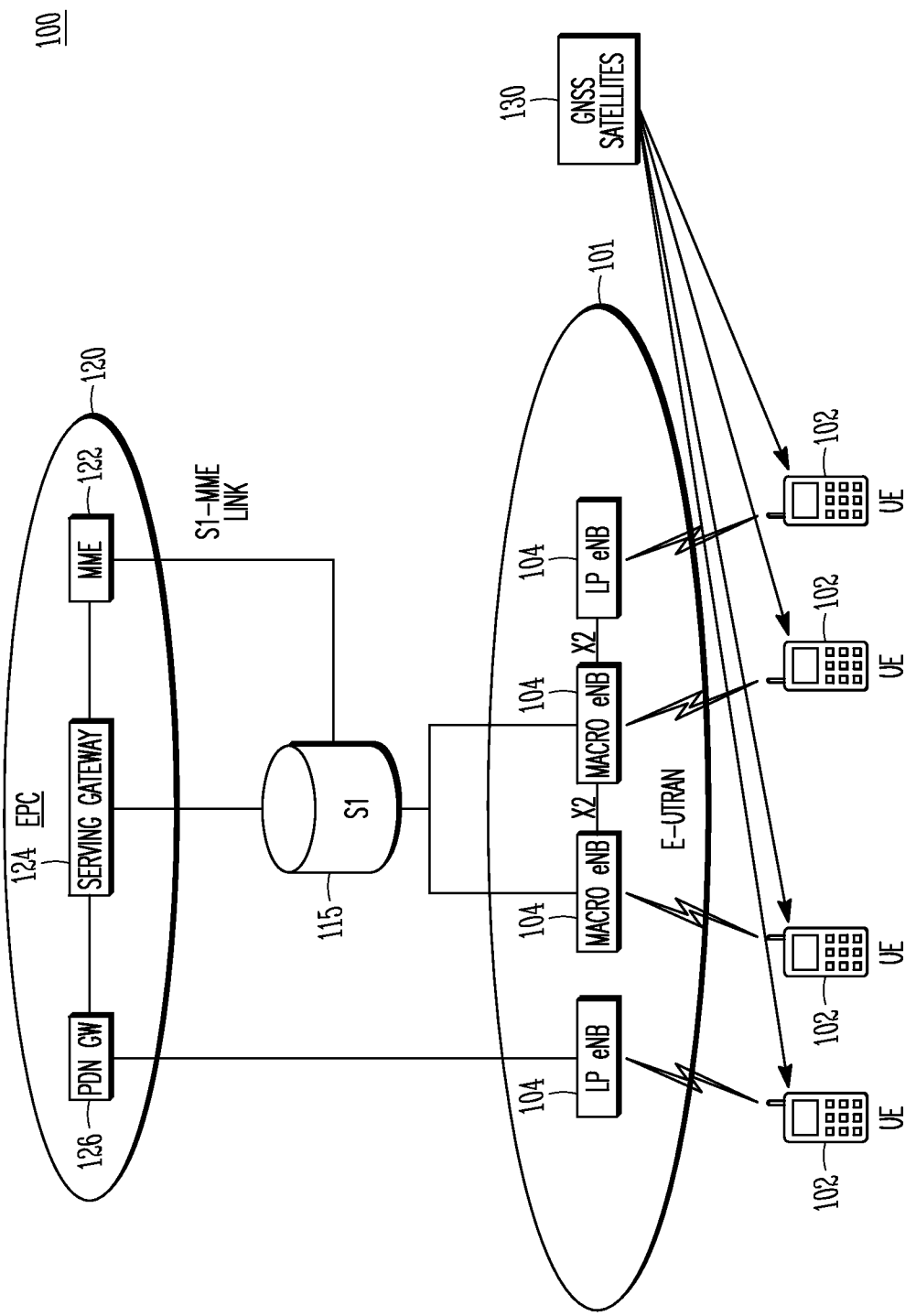
FIG. 1 is a functional diagram of a 3GPP network in accordance with some embodiments.

FIG. 1 is a functional diagram of a 3GPP network in accordance with some embodiments. The network may comprise a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes mobility management entity (MME) 122, serving gateway (serving GW) 124, and packet data network gateway (PDN GW) 126. The RAN 100 includes eNBs 104 (which may operate as base stations) for communicating with UE 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 100, and routes traffic packets (such as data packets or voice packets) between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes traffic packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. The eNBs 104 may communicate both with UEs 102 in a normal coverage mode and UEs 104 in one or more enhanced coverage modes. In some embodiments, an eNB 104 may fulfill various logical functions for the RAN 100 including but not limited to RNC (radio network controller functions) such as radio bearer management, uplink and downlink dynamic radio resource management and traffic packet scheduling, and mobility management. In accordance with some embodiments, UEs 102 may be configured to communicate via orthogonal multiple access (OMA) communications such as Time Division Multiple Access (TDMA), Frequency Division Multiple Access (FDMA)

Orthogonal FDMA (OFDMA), SC-FDMA or other communication signals with an eNB 104 over a multicarrier communication channel in accordance with the appropriate communication technique. The OFDM signals may comprise a plurality of orthogonal subcarriers. In accordance with some embodiments, UEs 102 may be configured to communicate via non-orthogonal multiple access (NOMA) signals.

The S1 interface 115 is the interface that separates the RAN 100 and the EPC 120. It is split into two parts: the S1-U, which carries traffic packets between the eNBs 104 and the serving GW 124, and the S1-MME, which is a signaling interface between the eNBs 104 and the MME 122.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell. One or more of the UEs may also be in communication with multiple GNSS satellites 130, obtaining navigation data from the satellites and coordinating the navigation data to obtain positional measurements.

Although communications using the LTE standard are described in detail above, embodiments described herein are not limited thereto and can be applied to other cellular communication networks and standards such as Global System for Mobile Communications (GSM), Enhanced Data Rates for GSM Evolution (EDGE), Worldwide Interoperability for Microwave Access (WiMAX), Wideband Code Division Multiple Access (W-CDMA), Time Division-Synchronous Code Division Multiple Access (TD-SCDMA), General Packet Radio Service (GPRS), and others. Further, embodiments are not limited only to cellular communication networks and may be implemented in other wireless networks such as wireless local area network (WLAN) and Bluetooth (BT) networks.

Figure 2:
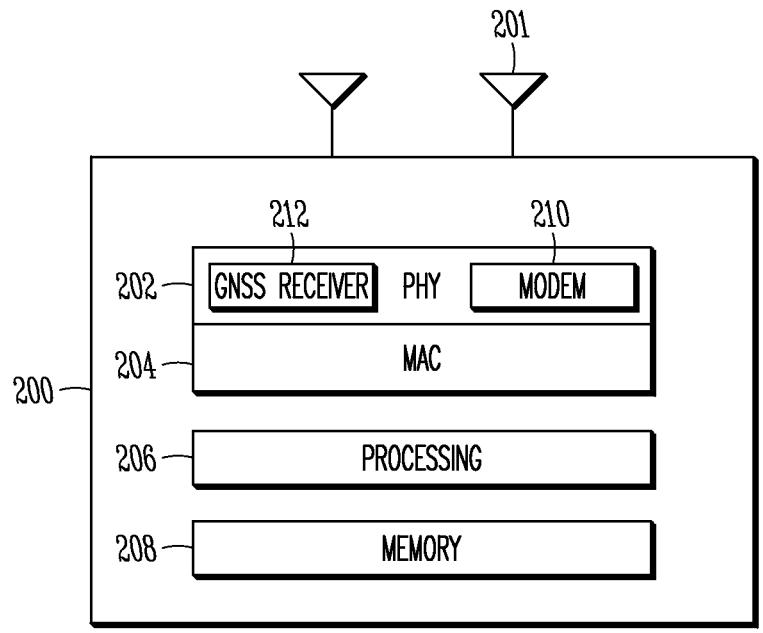
FIG. 2 is a block diagram of a 3GPP device in accordance with some embodiments.

FIG. 2 is a functional diagram of a 3GPP device in accordance with some embodiments. The device may be a UE or eNB, for example. In some embodiments, the eNB may be a stationary non-mobile device. The 3GPP device 200 may include physical layer circuitry 202 for transmitting and receiving signals using one or more antennas 201. The physical layer circuitry 202 may have different transceivers for network communication and satellite communication with each transmit and receive path having isolated electronic components. The 3GPP device 200 may also include medium access control layer (MAC) circuitry 204 for controlling access to the wireless medium. The 3GPP device 200 may also include processing circuitry 206 and memory 208 arranged to perform the operations described herein. The physical layer circuitry 202 may include a modem 210 and GNSS receiver 212 to receive GNSS signals from the satellites. The processing circuitry 206 may contain separate processors for cellular and GNSS signals or may contain a single processor for both types of signals.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a UE 102 or eNB 104 configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The antennas 201 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 may be effectively separated to take advantage of spatial diversity and the different channel characteristics that may result.

Although the 3GPP device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The term "machine readable medium" may include a single medium or multiple media (e.g., a centralized or distributed database, and/or associated caches and servers) configured to store one or more instructions. The term "machine readable medium" may include any medium that is capable of storing, encoding, or carrying instructions for execution by the 3GPP device 200 and that cause it to perform any one or more of the techniques of the present disclosure, or that is capable of storing, encoding or carrying data structures used by or associated with such instructions. The term "transmission medium" shall be taken to include any intangible medium that is capable of storing, encoding or carrying instructions for execution, and includes digital or analog communications signals or other intangible medium to facilitate communication of such software.

In GNSS systems, a GNSS satellite may transmit satellite positioning signals based on an atomic clock present in the satellite. The satellite positioning signals may include a time stamp indicating the time at which they were transmitted. A GNSS receiver (shown in FIG. 2) may be timed by a local clock synchronized to the satellite clock (referred to as the GNSS time). The GNSS receiver may estimate the GNSS time based on the satellite positioning signals to synchronize the local clock to the GNSS time. Once the local clock is accurately synchronized, the GNSS receiver may calculate the propagation time for the satellite positioning signals to reach the GNSS receiver, based on a difference between the time at which the satellite positioning signals were received, and the time at which they were transmitted. This propagation time is an indication of the distance between the satellite and the GNSS receiver.

To more accurately determine the location of the GNSS receiver, the GNSS receiver may perform the above process to calculate the distance to at least two other satellites and trilaterate. One source of inaccuracy is introduced by the difficulty of achieving fine-grained synchronization of the local clock at the GNSS receiver and the satellite clocks to provide an accurate estimate of the GNSS time at the GNSS receiver. Even minor offsets in the GNSS time estimate at the GNSS receiver may greatly affect the accuracy of the tracking in GNSS systems.

Figure 3:
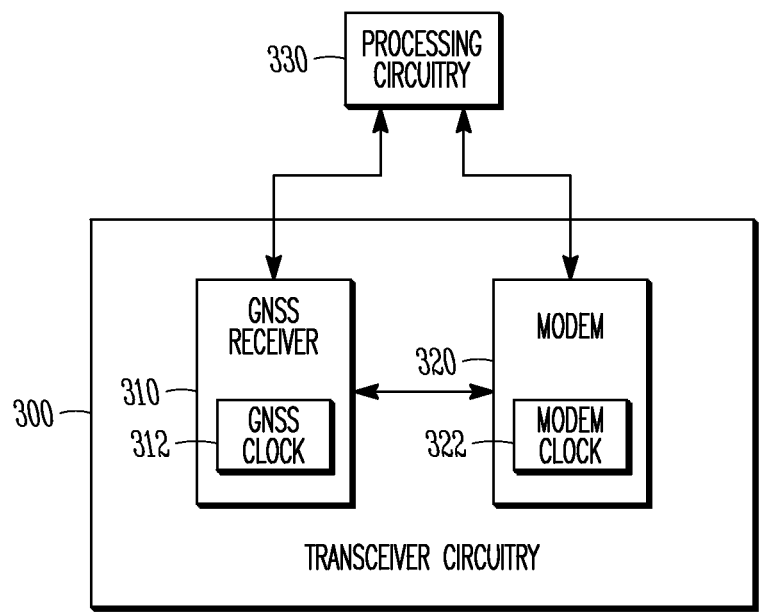
FIG. 3 is a block diagram of 3GPP transceiver circuitry in accordance with some embodiments.

In particular, synchronization, and thus GNSS positioning, may be problematic when in an area, such as inside a building, in which the satellite position signals are weak (e.g., less than about −145 dBm). To overcome such issues, the clock time of the cellular system may be used. FIG. 3 thus shows a block diagram of 3GPP transceiver circuitry in accordance with some embodiments. Components such as amplifiers, filters, mixers, buffers, multiplexers, Digital-to-Analog Converters (DACs), and Analog-to-Digital Converters (ADCs)) in other parts of the transmitter and receiver chains have not been shown in FIG. 3 for convenience.

In the transceiver circuitry 300 of FIG. 3 includes a GNSS receiver 310 containing a GNSS clock 312 and a modem (or cellular network transceiver) 320 containing a modem clock 322. Processing circuitry 330 may configure the modem 320 to provide to the GNSS receiver 312 fine time assistance information generated by the modem 320. The processing circuitry 330 may be external to the transceiver circuitry 300 or may be internal to the transceiver circuitry 300. In some embodiments, GNSS receiver 310 and/or modem 320 may contain the processing circuitry 330.

The GNSS receiver 310 may be configured to receive satellite positioning signals transmitted by multiple positioning satellites. The GNSS receiver 310 may provide the received satellite positioning signals to processing circuitry 330 to determine position and timing from the satellite positioning signals. The GNSS clock 312 may be set to GNSS timing (i.e., GNSS frame structure) when the GNSS receiver 310 has received the satellite positioning signals. The GNSS receiver 310 may receive GNSS satellite positioning signals via a GNSS frame structure. For example, a navigation message from one of the GPS satellites may include 25 frames, with each frame containing 1500 bits and being subdivided into 5 subframes of 300 bits each. The navigation message may be 12.5 minutes long, so that each frame is 30 s and each subframe is 6 s. Each subframe may be further divided into 10 30-bit segments in which the first two segments may respectively include telemetry data and handover word data while the remaining segments may include, dependent on the subframe, almanac or ephemeris data. The almanac data may include weekly-updated information related to the data on the health and general orbital information for every satellite in the constellation to enable the UE to determine visible satellite information for a specific date, time and location. The ephemeris data may contain more precise, detailed information on the orbit of an individual satellite. The telemetry data may include a preamble and parity bits. The handover word may include time-of-week (TOW) information, identification and parity bits.

Similarly, the modem 320 may communicate with one or more network devices, such as the eNB, other UEs or servers, via the network. The modem 320 may include a modem clock 322 that corresponds with network timing including network frame structure. The network frame structure and particular frame information (e.g., frame number) may depend on the Radio Access Technology (RAT) being used by the UE to connect with the network. For example, communication over an LTE network may be split up into 10 ms frames, each of which may contain ten 1 ms subframes. Each subframe of the frame, in turn, may contain two slots of 0.5 ms. The eNB may schedule uplink and downlink transmissions over a variety of frequency bands. The allocation of resources in subframes used in one frequency band and may differ from those in another frequency band. Each slot of the subframe may contain 6-7 symbols, depending on the system used. In some embodiments, the subframe may contain 12 or 24 subcarriers. A resource grid may be used for downlink and uplink transmissions between an eNB and a UE. The resource grid may be a time-frequency grid, which is the physical resource in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE in the current 3GPP standard. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. The duration of the resource grid in the time domain corresponds to one subframe or two resource blocks. Each resource grid may comprise 12 (subcarriers)*14 (symbols)=168 resource elements for normal cyclic prefix (CP) case. Several different physical channels may be conveyed using such resource blocks.

To enable timing information to be provided from the modem 320 to the GNSS receiver 310 in any meaningful fashion, in some embodiments it may be desirable to determine the relationship between the frame sequence used by the modem 320 in communication with the network and the frame sequence used by the GNSS receiver 310. Adding to this issue is that the frame sequence used by the modem 320 in communication with the network may change from time to time. In particular, handoffs of the UE between cells may result in different frame numbers being used by the modem 320 in communication with the network. Because in practice network elements are not perfectly synchronized, different frame numbers may wind up being used whether or not the handoffs result in a RAT change (i.e., both inter-[e.g., WCDMA to GSM] and intra-RAT [e.g., LTE to LTE cells] changes).

Determination of the frame timing between satellite frames and cellular frames may be useful in obtaining fine time assistance. The GNSS receiver 310 may generally be configured to receive the TOW information above from the satellite positioning data provided by the satellites. The TOW information, which may be obtained by tracking the satellites over the course of the 6 s subframe containing the TOW information, may be used to determine the UE position. Typically, the GNSS receiver 310 may coherently and/or non-coherently integrate the received signal to look for a correlation peak to determine the location of the satellite positioning data. If the satellite positioning signal is too weak however (e.g., as above less than about −145 dBm), the UE may take an inordinate amount of integration time to obtain the correlation peak due to a large search space or, in some circumstances, be unable to decode the TOW information from the satellite positioning data using correlation as there are too many bit errors to decode. In some cases, the UE may use pattern matching rather than correlation and rely on cellular-based timing data from the modem to reliably calculate its position.

In either case, the timing search space may be decreased using reliable cellular-based timing data from several seconds (coarse time assistance) to several µs (fine time assistance). Coarse time assistance may not be as useful as fine time assistance due to large errors in satellite position resulting from the time error. In one example of fine time assistance, a GPS receiver may receive continuously transmitted 1 ms pseudo-random repeated sequences of 1023 chips and may search over all possible code delays with a 1 ms window to find the proper sub-ms delay to acquire a satellite signal using GPS. Receiving fine time assistance (in this case, which is more accurate than 1 ms) may enable the GPS receiver to reduce the maximum number of code delays to be searched. The search space reduction may be inversely proportional to the accuracy in which the TOW information is provided to the GPS receiver. Fine time assistance may, in some embodiments, permit the UE to avoid decoding the TOW information and reduce the amount of power used by the UE by eliminating the amount of time used to obtain the TOW information from the satellites, thereby improving the time-to-first-fix (TTFF).

As the timing data may be cellular-based, translation between the cellular timing system and GNSS system may be used to enable fine time assistance for the GNSS system. To enable fine time assistance information to be consistently provided by the cellular network, the various elements (e.g., eNBs, etc. . . . ) within the network are to be synchronized. Unfortunately, in practice networks such as 2G and 3G cellular systems are, at best, coarsely synchronized (to several seconds) and do not support fine time assistance due to costs associated with both the initial synchronization and maintenance of the synchronization of the network elements. To overcome this issue, fine time assistance may be generated locally within the UE, in some embodiments within the modem. In this manner, time synchronization of cellular system may be provided by the cellular system physical layer of the UE to the GNSS receiver when desired.

Figure 4:
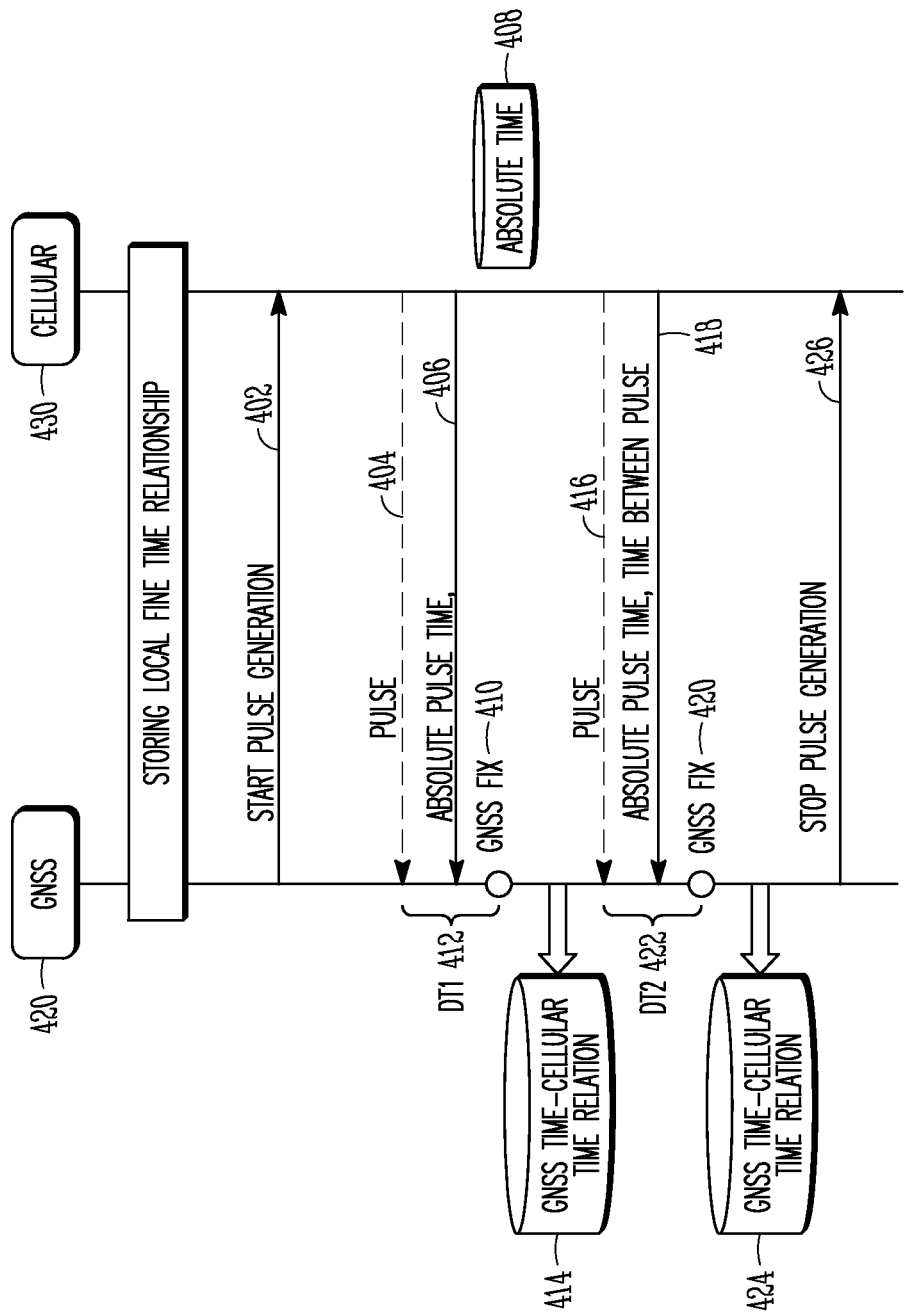
FIG. 4 illustrates generation of a GNSS-cellular relationship in accordance with some embodiments.

FIG. 4 illustrates generation of a GNSS-cellular relationship in accordance with some embodiments. The GNSS receiver 420 and cellular receiver 430 may both be disposed in a UE. The GNSS receiver 420 may determine that a GNSS location is desired but that the satellite positioning signal is too weak to extract the TOW information using correlation. In response to determining that a GNSS location is desired, the GNSS receiver 420 may transmit a first request for a pulse 402 to the cellular connection (modem) 430.

In response to receiving the request, the modem 430 may access or otherwise determine the absolute time 408. The modem 430 may subsequently transmit the pulse 404 to the GNSS receiver 420. In addition, the modem 430 may subsequently transmit pulse timing information that includes the absolute time of the pulse (also referred to as the pulse transmission time) to the GNSS receiver 420. The pulse timing information may be transmitted as part of the pulse 404 or, as shown, in an entirely separate transmission 406. In the latter embodiment, the pulse timing information may be transmitted at any point after transmission of the pulse 404. For example, as shown, the pulse timing information may be transmitted after transmission of the pulse 404 but prior to the GNSS fix 410. In other embodiments, the pulse timing information may be transmitted after the GNSS fix 410 or even later, e.g., after the last pulse has been generated. The pulse timing information may be based on the cellular system.

The GNSS receiver 230 may determine the time in the GNSS system when the pulse 404 from the modem 430 has been received. The GNSS receiver 230 may obtain a GNSS fix 410, i.e., the location of the UE, after receiving the pulse 404 from the modem 430. The GNSS receiver 230 may determine the time difference dT1 412 between when the pulse 404 from the modem 430 has been received and when the GNSS fix 410 has been achieved. The GNSS-cellular relationship 414 may be determined with several µs accuracy through the use of the information provided by the modem 430 and stored by the GNSS receiver 420 for later use. The information provided by the modem 430 may thus be used by the GNSS receiver to reduce unknown variable delays that degrade the accuracy of the time assistance.

The modem 430 may transmit another pulse 404 to the GNSS receiver 420. In some embodiments, the modem 430 may transmit the other pulse 404 to the GNSS receiver 420 automatically, i.e., without the GNSS receiver 420 transmitting another request for the other pulse 404. In some embodiments, the other pulse 404 may be transmitted after the time difference 412 is stored by the GNSS receiver 420. The timing for the next pulse may be predetermined or transmitted in the pulse request 402.

The modem 430 may obtain the absolute time that the other pulse 416 is transmitted to the GNSS receiver 420. As above, the modem 430 may subsequently transmit the absolute time of the pulse 418 to the GNSS receiver 420. In this case, the modem 430 may also send the time between pulse transmissions in case either the absolute time of the other pulse is unavailable or not accurate to the degree desired (e.g., due to an inter- or intra-RAT change). In some embodiment, the transmission may include the absolute pulse time of the original pulse 404 and the time between pulses 404, 416 to enable the GNSS receiver 420 to extract the absolute time of the other pulse 416. The pulse timing information including the absolute time and the time between pulse transmissions may each be based on the cellular system time. The pulse timing information may be provided in one or more of a number of different formats. In some embodiments, the absolute time information may be provided using a free running counter maintained by the modem across cell changes and RAT changes. In some embodiments, the absolute time information may be provided using an absolute counter generated by a relative counter with offset times maintained across inter-RAT and intra-RAT cell changes since transmission of the last counter. The absolute time information may also be stored in the modem.

The GNSS receiver 420 may determine the time in the GNSS system when the other pulse 416 from the modem 430 has been received. The GNSS receiver 420 may obtain another GNSS fix 420 after receiving the other pulse 416 from the modem 430. The GNSS receiver 420 may determine the time difference dT2 422 between when the other pulse 416 from the modem 430 has been received and when the other GNSS fix 420 has been achieved. The time difference 422 may then be stored 424 by the GNSS receiver 420 for later use.

In some embodiments, the modem 430 may continue to transmit pulses periodically. After a predetermined number of pulses have been transmitted by the modem 430, the GNSS receiver 230 may transmit a terminate pulse message 426 to the modem 430 to stop pulse generation. In response, the modem 430 may no longer transmit pulses. In some embodiments, rather than transmitting a request to stop pulse generation 426, the number of pulses may be predetermined or transmitted in the pulse request 402.

Figure 5:
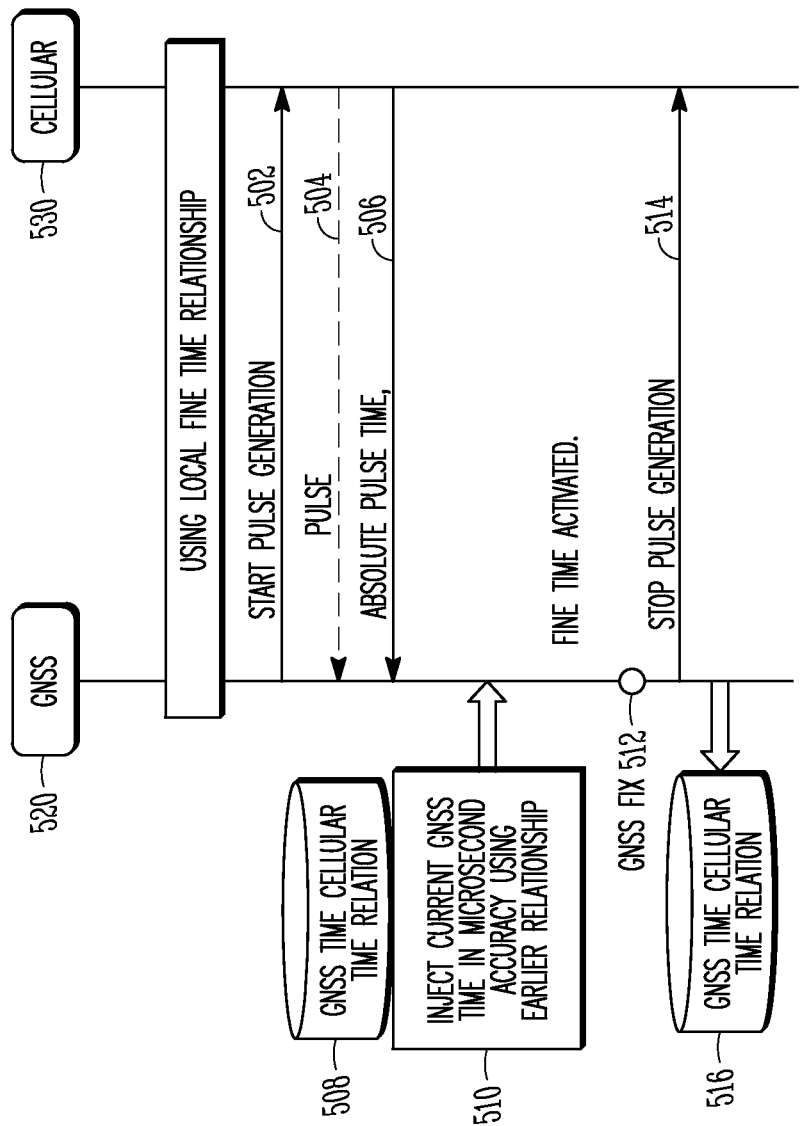
FIG. 5 illustrates generation of a GNSS-cellular relationship in accordance with some embodiments.

FIG. 5 illustrates generation of a GNSS-cellular time relationship in accordance with some embodiments. The embodiment shown in FIG. 5 illustrates an example of local fine time assistance in which the GNSS time-Cellular time relationship has already been determined using the operations shown in FIG. 4. In general, the GNSS current time with sub-ms and perhaps μs accuracy may be generated from the previously stored GNSS-cellular time relationship and latest absolute pulse time. The GNSS receiver 520 may determine that a GNSS location is desired but that the satellite positioning signal is too weak to extract the TOW information using correlation. In this embodiment, the GNSS receiver 520 and modem 530 have already communicated via requests, pulses and pulse timing information. The GNSS-cellular time relationship has already been determined and is stored in memory as described above in relation to FIG. 4. The GNSS receiver 520 may determine that a GNSS location is desired. In response to determining that a GNSS location is desired, the GNSS receiver 520 may transmit a first request for a pulse 502 to the modem 530.

In response to receiving the request, the modem 530 may access or otherwise determine the absolute time 508. The modem 530 may subsequently transmit the pulse 504 to the GNSS receiver 520. In addition, the modem 530 may subsequently transmit cellular system pulse timing information that includes the absolute time of the pulse to the GNSS receiver 520. As above, the pulse timing information may be transmitted as part of the pulse 504 or in an entirely separate transmission 506 at any point after transmission of the pulse 504.

The GNSS receiver 520 may determine the time in the GNSS system when the pulse 504 from the modem 530 has been received. The GNSS receiver 520, having previously stored the GNSS-cellular time relationship 508, extracts the relationship 508 and converts the absolute pulse time to the equivalent GNSS time 510, thereby using the fine time assistance. The GNSS receiver 520 may then obtain a GNSS fix 512 using the GNSS time 510. The GNSS receiver 520 may transmit a terminate pulse message 514 to the modem 430 to stop pulse generation. The GNSS receiver 520 may store the GNSS-cellular time relationship 516 generated using the absolute pulse time 506. The subsequent pulse times and consequent GNSS fix shown in FIGS. 4 and 5 may further improve GNSS-cellular time relationship by providing periodic updates that may be used to refresh the GNSS-cellular time relationship as well as any dependency of the time on the particular cellular RAT being used by the modem and the accuracy of knowledge and precision of time from network.

As above, the absolute time information may be provided in cellular time using a free running or absolute counter. In some embodiments, the modem may maintain the absolute reference time. In some embodiments, the modem may not maintain the absolute reference time, instead relying on a relative time. In this latter case, the modem may maintain other information to generate the absolute pulse time and time between pulses. This other information may include the relative reference time at the time of pulse transmission, a cumulative cell switching time offset (both positive and negative) of all inter- and intra-RAT transitions from transmission of the last generated pulse and the cumulative number of frame wraparounds (reset of the system frame number (SFN)) to maintain the number of frame wraparounds per RAT from transmission of the last generated pulse. The offset time may be stored by the modem whenever there is a move between cells and RATs. In one example, the SFN runs from 0-1023 in LTE systems, in 3G systems the SFN runs from 0-2559 (10 ms*256), and in 2G systems the SFN runs from 0-18903 (4.615 ms*4096). Thus, after the maximum number, the SFN resets to frame number 0 to indicate the frame number used for uplink/downlink transmissions. Different RATs and cells may have different system frame numbers.

The absolute reference time may be generated using equation (1):

$$AbsTime = F_m + \sum_{r=1}^{R}\left[dT_r + n_r f_r + \sum_{n=1}^{N} dT_{nr}\right] \quad (1)$$

where: $F_m$=Current Reference time (e.g., in ms), R=Number of Intra-RAT changes, N=Number of Inter-RAT changes, $n_r$=Number of frame wraparound, $f_r$=Time of 1 wraparound, $dT_{nr}$=Time offset for intra-RAT changes, and $dT_r$=Time offset of inter-RAT changes. The time may be returned in absolute time in one or more of different temporal measurements, including s, ms, and/or μs, absolute counter or modem cellular frame format.

Figure 6:
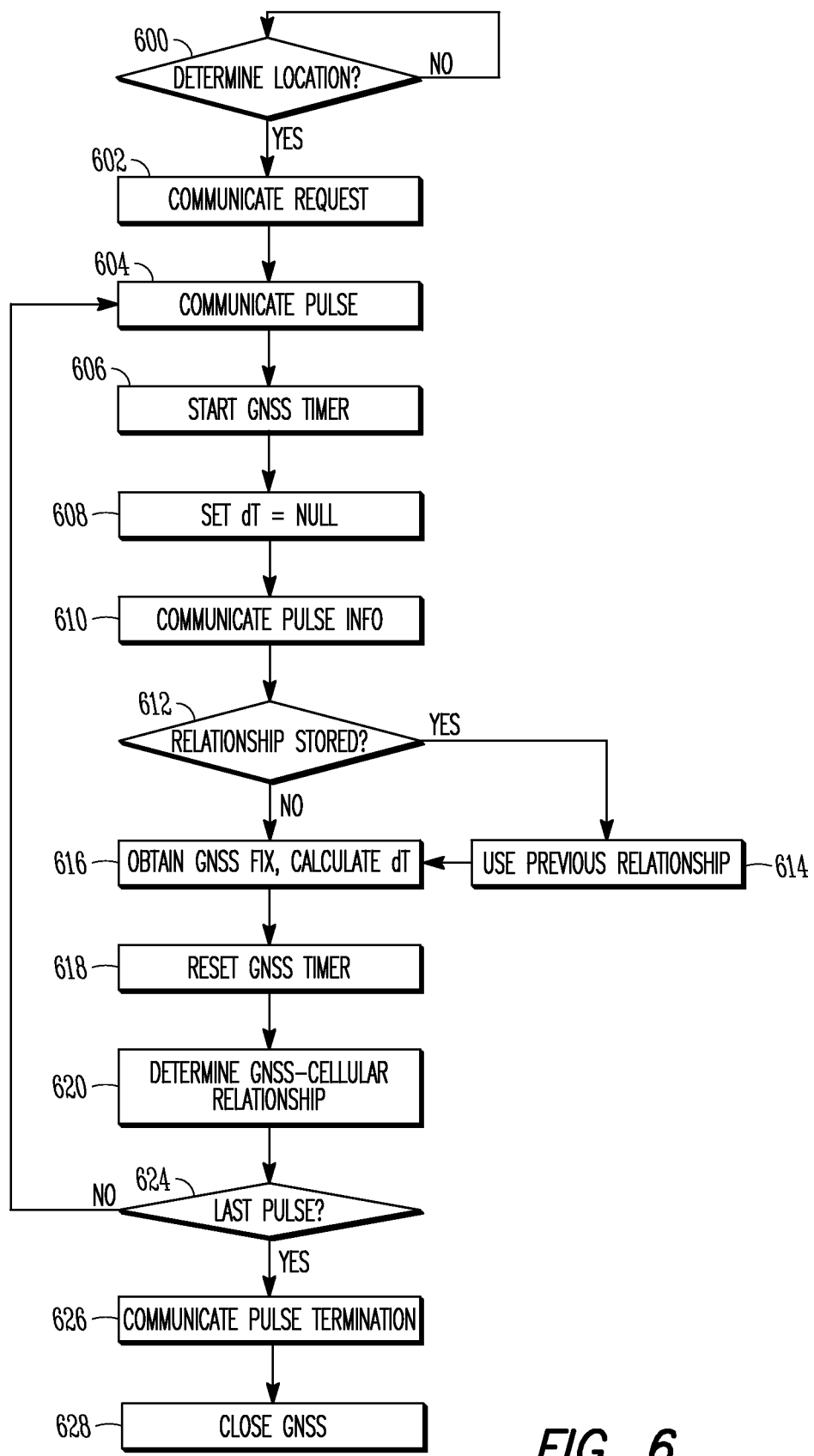
FIG. 6 illustrates a flowchart for providing local fine time assistance in accordance with some embodiments.

FIG. 6 illustrates a flowchart for providing local fine time assistance in accordance with some embodiments. The operations of FIG. 6 may be used by the UE shown in any of FIGS. 1-3. As shown, local fine time assistance may be generated within the UE, using only temporal information either provided internally or obtained from the network with which the UE is connected, without or prior to being provided cellular fine time assistance from the network. In some embodiments, information for generating the local fine time assistance may be generated at a modem and provided to a GNSS receiver. The local fine time assistance may then be generated at the GNSS receiver and used to obtain the UE location via the GNSS satellite positioning signals. Although throughout the description of FIG. 6, the GNSS receiver and modem are referred to as performing the various operations, in some embodiments one or more processors in the GNSS receiver and modem and/or external to the GNSS receiver and modem may perform one or more of the operations. At operation 600, the UE may determine that a GNSS location is desired. The location determination may be, in one example, the result of an automatic update of an application running on the UE. Alternatively, the location determination may be, in another example, the result of user manually activating an application on the UE that requests a GNSS location for functionality.

In response to determining that a new GNSS-cellular time relationship is to be generated, the GNSS receiver at operation 602 may generate a request for the modem to transmit a timing pulse to the GNSS receiver. The request may or may not include how many pulses are to be transmitted or a relative time (e.g., 15 s, 1 min, etc. ... from the receipt of the request) as to when the pulses are to be terminated and/or the format in which timing information of the pulse is to be transmitted, such as temporal measurement, counter type, or modem cellular frame format. The request may be transmitted along a printed circuit board housing the circuitry forming the GNSS receiver and the circuitry forming the modem using a wired connection between the GNSS receiver and the modem. The modem may then receive the request from the GNSS receiver.

In response to the modem receiving the request from the GNSS receiver, the modem may process the request and transmit the pulse to the GNSS receiver at operation 604. The GNSS receiver may thereafter receive the pulse from the modem. The pulse may or may not contain any timing information. For example, the pulse may simply provide an acknowledgment of the request and perhaps identify the modem.

At operation 606, having received the pulse from the modem, the GNSS receiver may start a GNSS timer and attempt to obtain a GNSS fix and thus the location of the UE. The timer may be based on GNSS time rather than cellular time.

At operation 608 the modem may set an element of pulse information to be transmitted to the GNSS receiver to a null or not available value. In one embodiment, this value may be the difference between the current pulse and the previous pulse transmitted to the GNSS receiver. After setting the time difference to the null value at operation 608, the modem may transmit at operation 610 to the GNSS receiver pulse information after transmitting the pulse itself. The pulse information may be stored in the modem or obtained through communication with the network, such as with the eNB serving the UE. The pulse information may contain the absolute time that the pulse was transmitted and perhaps the above time differential between adjacent pulses. In some embodiments, some or all of the pulse information may be contained within the pulse itself. The pulse information may be based on a cellular network time and may be provided in one or more of different formats including temporal measurement, counter type, or modem cellular frame format. The format may be determined by the request, as above, or may be determined by the modem. The absolute time may include a reference time that the pulse was transmitted, a cumulative cell switching time offset (both positive and negative) of all inter- and intra-RAT transitions from transmission of the last generated pulse (if any) and the cumulative number of frame wraparounds from transmission of the last generated pulse. The GNSS receiver may receive the pulse information.

At operation 612, the UE may determine whether a GNSS-cellular time relationship has been stored. The UE may thus determine whether fine time assistance is locally available, similar to the embodiment shown in FIG. 5 or whether a new GNSS-cellular time relationship is to be generated, similar to the embodiment shown in FIG. 4. The relationship determination may be made by the GNSS receiver.

After determining a relationship is not stored at operation 612, the GNSS receiver may at operation 616, obtain a GNSS fix using the satellite positioning signal. In some embodiments, the time differential dT (dT1, dT2, etc. ... ) may be calculated irrespective of whether a previous relationship is available; if previous relationship is available, the fine time information may be injected, thus aiding GNSS position fix. In some embodiments, dT may be calculated from the time the pulse is received to the time when a GNSSS fix is obtained. As discussed above, as the satellite positioning signal may be too weak to detect using correlation techniques, the GNSS receiver may attempt to use pattern matching to determine the satellite positioning signal and thus the UE location.

After obtaining the GNSS fix at operation 616, the GNSS receiver may reset the GNSS timer at operation 618. The GNSS timer may be reset to zero or some non-zero value. In some embodiments, the counter may be used as a timeout to reset the GNSS fix. For example, if the timer is set to a non-zero value and is decremented, once the timer reaches zero, an error may be generated and the system reset.

At operation 620, the GNSS receiver may determine a relationship between the GNSS time and the cellular (network) time based on the information obtained at operation 614 as well as the time to obtain the GNSS fix at operation 616. Operation 620 may occur either before or after operation 618, when the GNSS timer has been reset.

After determining the GNSS-cellular time relationship at operation 620, the GNSS receiver may determine at operation 624 whether any more pulses are to be used. In some embodiments, the GNSS receiver may determine how many pulses to request prior to transmitting the first request to the modem, e.g., using a predetermined number after each initiation.

In some embodiments, once requested, the modem may periodically transmit pulses and corresponding pulse information to the GNSS receiver. The modem may transmit a predetermined number of pulses to the GNSS receiver or may continue to transmit the pulses until instructed to cease transmission. The periodicity and/or number of pulses may be predetermined or may be transmitted in the request from the GNSS receiver. In response to determining that further pulses are to be used, in some embodiments the GNSS receiver may simply return to operation 604 and wait until the modem transmits the next pulse. In other embodiments, the GNSS receiver may return to operation 602 and transmit a request to the modem for another pulse.

In response to determining at operation 624 that no further pulses are desired, the GNSS receiver may transmit a request to the modem to terminate pulse transmission at operation 626. The modem, after receiving the termination request, in response may process the request and stop sending pulses and pulse information to the GNSS receiver.

At operation 628, the GNSS receiver may receive the termination request. The GNSS receiver may, in response, determine that pulses are no longer desired as an adequate GNSS-cellular relationship has been obtained and may be used in further location determination procedures using the GNSS receiver.

In response to determining that a GNSS-cellular time relationship is stored at operation 602, the GNSS receiver at operation 614 may apply the local fine time relationship after determining the absolute time from the network time. That is, the GNSS receiver may use the previously stored relationship to inject an accurate representation of the current GNSS time and obtain fine time assistance. Subsequently, a request may be provided at operation 602 to provide an update to the GNSS-cellular relationship. Thus, in some embodiments, the GNSS time=Previous GNSS time+Δ cellular time, where Δ cellular time=Current Absolute Time−Previous Absolute Time. The relationship stored may be (Absolute Time+dT1, GPS ToW), thus at the GPS time, cellular absolute time is absolute time+dT1.

Various examples of the disclosure are provided below. These examples are not intended to in any way limit the disclosure herein. In Example 1, an apparatus of user equipment (UE) comprises: a modem arranged to communicate with an enhanced Node B (eNB); a Global Navigation Satellite System (GNSS) receiver arranged to receive satellite positioning signals from a plurality of satellites; and processing circuitry arranged to: generate local fine time assistance prior to receiving cellular fine time assistance from a network with which the UE is connected; instruct the modem to provide information for the local fine time assistance to the GNSS receiver; instruct the GNSS receiver to obtain GNSS satellite positioning signals using the local fine time assistance; and instruct the modem to maintain the local fine time assistance during at least one of inter- and intra-Radio Access Technology (RAT) transitions of the UE.

In Example 2, the subject matter of Example 1 can optionally include that the processing circuitry is further arranged to: instruct the GNSS receiver to transmit a request to the modem; instruct the modem to receive the request from the GNSS receiver; instruct the modem to transmit a pulse and pulse timing information to the GNSS receiver as the information for the local fine time assistance in response to the modem receiving the request; and instruct the GNSS receiver to obtain a GNSS fix after transmitting the request.

In Example 3, the subject matter of Example 2 can optionally include that the pulse timing information comprises at least one of a pulse transmission time and a pulse time difference between the pulse transmission time and a previous pulse transmission time of a preceding pulse transmitted by the modem.

In Example 4, the subject matter of Example 3 can optionally include that the processing circuitry is further arranged to instruct the GNSS receiver to determine a GNSS time difference between the pulse transmission time and a GNSS fix time when the GNSS receiver determines a location of the UE.

In Example 5, the subject matter of Example 4 can optionally include that the pulse transmission time and pulse time difference are indicated in cellular network time, the GNSS fix time is indicated in GNSS time, and the processing circuitry is further arranged to: determine a GNSS-cellular time relationship based on the pulse timing information and GNSS fix time, determine a GNSS current time based on the GNSS-cellular time relationship and the pulse timing information, and obtain GNSS satellite signals using the GNSS current time.

In Example 6, the subject matter of Example 5 can optionally include that the processing circuitry is further arranged to: instruct the modem to transmit pulses periodically to the GNSS receiver, limit a number of pulses transmitted by the modem to a predetermined number of pulses, determine a GNSS-cellular time relationship based on pulse timing information and GNSS fix time associated with each pulse, determine a GNSS current time based on each GNSS-cellular time relationship and pulse timing information, and obtain GNSS satellite signals based on each GNSS current time.

In Example 7, the subject matter of Example 5 can optionally include that the processing circuitry is further arranged to: determine at least one GNSS current time based on a previously determined GNSS-cellular time relationship and a current pulse timing information, and obtain GNSS satellite signals based on the at least one GNSS current time.

In Example 8, the subject matter of Example 2 can optionally include that the processing circuitry is further arranged to: determine an absolute cellular network time used in generating the local fine time assistance, the absolute cellular network time determined in modem cellular frame format and comprising: a relative reference time of the pulse timing information, cumulative cell switching time offsets of inter- and intra-RAT transitions of the UE since an immediately preceding pulse, and a cumulative number of frame wraparounds for each RAT since the immediately preceding pulse.

In Example 9, the subject matter of Example 2 can optionally include that the processing circuitry is further arranged to: determine an absolute cellular network time used in generating the local fine time assistance, the absolute cellular network time determined as at least one of: a free running counter maintained across cell changes and RAT changes, and an absolute counter generated by a relative counter with offset times maintained across inter-RAT and intra-RAT cell changes since an immediately preceding pulse.

In Example 10, the subject matter of any one or combination of Examples 1-9 can optionally include that the processing circuitry is further arranged to: instruct the modem to maintain an absolute cellular network time, the absolute cellular network time used in generating the information for the local fine time assistance.

In Example 11, the subject matter of any one or combination of Examples 1-10 can optionally include an antenna arranged to transmit and receive communications between the transceiver and the eNB.

In Example 12, an apparatus of user equipment (UE) comprises: a modem arranged to transmit a pulse and pulse timing information comprising a pulse transmission time of the pulse based on cellular network time, the modem maintaining consistent timing for the pulse transmission time across inter- and intra-Radio Access Technology (RAT) transitions of the UE; and a Global Navigation Satellite System (GNSS) receiver arrange to receive the pulse and pulse timing information, determine a GNSS-cellular time relationship and obtain a GNSS satellite positioning signal using the pulse timing information.

In Example 13, the subject matter of Example 12 can optionally include that the pulse and pulse timing information are transmitted in separate transmissions.

In Example 14, the subject matter of Example 12 can optionally include that the GNSS receiver is further arranged to transmit a request to the modem, and the modem is further arranged to transmit the pulse and pulse information in response to receiving the request from the GNSS receiver.

In Example 15, the subject matter of Example 14 can optionally include that the pulse timing information comprises a pulse time difference between the pulse transmission time and a previous pulse transmission time of a preceding pulse transmitted by the modem.

In Example 16, the subject matter of Example 14 can optionally include that the GNSS receiver is further arranged to determine a GNSS time difference between the pulse transmission time and a GNSS fix time when the GNSS receiver determines a location of the UE.

In Example 17, the subject matter of Example 16 can optionally include that the pulse transmission time and pulse time difference are indicated in cellular network time, the GNSS fix time is indicated in GNSS time, the GNSS-cellular time relationship is based on the pulse timing information and GNSS fix time, and the GNSS receiver is further arranged to determine a GNSS current time based on the GNSS-cellular time relationship and the pulse timing information.

In Example 18, the subject matter of Example 17 can optionally include that the modem is further arranged to transmit pulses periodically to the GNSS receiver in response to receiving the request, the GNSS receiver is further arranged to transmit a termination request to the modem, and the modem is further arranged to terminate transmission of the pulses in response to receiving the termination request.

In Example 19, the subject matter of any one or combination of Examples 12-18 can optionally include that the modem is further arranged to maintain an absolute cellular network time, the absolute cellular network time used in generating the pulse timing information.

In Example 20, the subject matter of any one or combination of Examples 12-19 can optionally include that the modem is further arranged to determine an absolute cellular network time used in the pulse timing information, the absolute cellular network time determined in modem cellular frame format and comprising: a relative reference time of the pulse timing information, cumulative cell switching time offsets of inter- and intra-RAT transitions of the UE since an immediately preceding pulse, and a cumulative number of frame wraparounds for each RAT since the immediately preceding pulse.

In Example 21, the subject matter of any one or combination of Examples 12-20 can optionally include that the modem is further arranged to determine an absolute cellular network time used in generating the local fine time assistance, the absolute cellular network time determined as at least one of: a free running counter maintained across cell changes and RAT changes, and an absolute counter generated by a relative counter with offset times maintained across inter-RAT and intra-RAT cell changes since an immediately preceding pulse.

In Example 22, the subject matter of any one or combination of Examples 12-21 can optionally include that the GNSS is further arranged to use the GNSS-cellular time relationship to obtain a later GNSS fix after obtaining a GNSS fix based on the pulse timing information.

In Example 23, a non-transitory computer-readable storage medium stores instructions for execution by one or more processors of a user equipment (UE), the one or more processors to instruct the UE to: instruct a Global Navigation Satellite System (GNSS) receiver to transmit a request to a modem; instruct the modem, in response to receiving the request, to transmit transmissions comprising a pulse and pulse timing information comprising a pulse transmission time of the pulse based on cellular network time, the modem arranged to maintain consistent timing for the pulse transmission time across inter- and intra-Radio Access Technology (RAT) transitions of the UE; and further instruct the GNSS receiver to receive the pulse and pulse timing information, determine a GNSS-cellular time relationship and obtain a GNSS satellite positioning signal using the pulse timing information.

In Example 24, the subject matter of Example 23 can optionally include that at least one of: the pulse timing information comprises a pulse time difference between the pulse transmission time and a previous pulse transmission time of a preceding pulse transmitted by the modem, and the GNSS receiver is further arranged to determine a GNSS time difference between the pulse transmission time and a GNSS fix time when the GNSS receiver determines a location of the UE.

In Example 25, the subject matter of Example 23 or 24 can optionally include that the modem is further arranged to transmit pulses periodically to the GNSS receiver in response to receiving the request, the GNSS receiver is further arranged to transmit a termination request to the modem, and the modem is further arranged to terminate transmission of the pulses in response to receiving the termination request.

In Example 26, a method of providing local fine time assistance in a user equipment (UE), the method comprises: transmitting, from a Global Navigation Satellite System (GNSS) receiver to a modem, a request; transmitting, from the modem to the GNSS and in response to the modem receiving the request, a plurality of sets of transmissions, each set of transmissions comprising a pulse and pulse timing information, the pulse timing information comprising a pulse transmission time of the pulse based on cellular network time, consistent timing for the pulse transmission time maintained across inter- and intra-Radio Access Technology (RAT) transitions of the UE; and in response to receiving the pulse and pulse timing information, the GNSS receiver determining a GNSS-cellular time relationship and obtaining a GNSS satellite positioning signal using the pulse timing information.

In Example 27, the subject matter of Example 26 can optionally include that at least one of: the pulse timing information comprises a pulse time difference between the pulse transmission time and a previous pulse transmission time of a preceding pulse transmitted by the modem, and the method further comprises the GNSS determining a GNSS time difference between the pulse transmission time and a GNSS fix time when the GNSS receiver determines a location of the UE.

In Example 28, the subject matter of Example 26 or 27 can optionally include that the sets of transmissions are transmitted periodically, and the method further comprises: transmitting a termination request from the GNSS receiver to the modem, and terminating transmission of the sets of transmissions by the modem in response to receiving the termination request.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus of a mobile device comprising:
a processor configured to execute instructions to:
at a first time:
obtain a first Global Navigation Satellite System (GNSS) fix, wherein the first GNSS fix is based on satellite positioning signals received from a plurality of satellites;
determine a first GNSS fix time of the first GNSS fix;
receive, from a cellular modem of the mobile device, a first pulse and first pulse timing information of the first pulse, the first pulse timing information indicating a first pulse time in cellular network time; and
determine, based on the first pulse time in cellular network time and the first GNSS fix time, a GNSS-cellular time relationship; and
at a second time, subsequent to the first time:
determine that a GNSS signal from the plurality of satellites is too weak to extract time of week (TOW) information;
in response to the determination that the GNSS signal from the plurality of satellites is too weak to extract the TOW information, request, from the cellular modem of the mobile device, a second pulse;
receive, from the cellular modem of the mobile device, the second pulse and second pulse timing information of the second pulse, the second pulse timing information indicating a second pulse time in cellular network time, wherein the second pulse timing information is based on:
cumulative cell switching time offsets of inter- and intra-radio access technology (RAT) transitions of the mobile device since an immediately preceding pulse; and
a cumulative number of frame wraparounds for each RAT;
determine, based on the second pulse time and the GNSS-cellular time relationship, a GNSS time; and
obtain, based on the GNSS time and GNSS satellite positioning signals, a second GNSS fix.

2. The apparatus of claim 1, wherein the processor is further configured to:
start a GNSS timer in response to reception of the second pulse, wherein to determine the GNSS time is further based on the GNSS timer.

3. The apparatus of claim 1, wherein the processor is further configured to:
determine that the GNSS-cellular time relationship is to be generated; and
in response to the determination that the GNSS-cellular time relationship is desired, request the first pulse from the cellular modem.

4. The apparatus of claim 3, wherein the processor is further configured to:
in response to the determination that the second GNSS fix is to be generated and the determination that the GNSS signal from the plurality of satellites is too weak to extract the TOW information, request the second pulse from the cellular modem.

5. The apparatus of claim 3, wherein, to request the first pulse from the cellular modem, the processor is further configured to:
request a plurality of periodic pulses, wherein to request the plurality of periodic pulses includes specifying at least one of a number of the plurality of periodic pulses or a periodicity of transmission of the plurality of periodic pulses.

6. The apparatus of claim 5, wherein the processor is further configured to:
indicate to the cellular modem to terminate transmission of the plurality of periodic pulses.

7. The apparatus of claim 1, wherein the first pulse timing information is indicated in the first pulse.

8. The apparatus of claim 1, wherein the first pulse timing information is indicated in a message separate from the first pulse.

9. A mobile device comprising:
a Global Navigation Satellite System (GNSS) receiver;
a cellular modem; and
a processor configured to execute instructions to:

at a first time:
obtain a first Global Navigation Satellite System (GNSS) fix, wherein the first GNSS fix is based on satellite positioning signals received from a plurality of satellites;
determine a first GNSS fix time of the first GNSS fix;
receive, from a cellular modem of the mobile device, a first pulse and first pulse timing information of the first pulse, the first pulse timing information indicating a first pulse time in cellular network time; and
determine, based on the first pulse time in cellular network time and the first GNSS fix time, a GNSS-cellular time relationship; and
at a second time, subsequent to the first time:
determine that a GNSS signal from the plurality of satellites is too weak to extract time of week (TOW) information;
in response to the determination that the GNSS signal from the plurality of satellites is too weak to extract the TOW information, request, from the cellular modem of the mobile device, a second pulse;
receive, from the cellular modem of the mobile device, the second pulse and second pulse timing information of the second pulse, the second pulse timing information indicating a second pulse time in cellular network time, wherein the second pulse timing information is based on:
cumulative cell switching time offsets of inter- and intra-radio access technology (RAT) transitions of the mobile device since an immediately preceding pulse; and
a cumulative number of frame wraparounds for each RAT;
determine, based on the second pulse time and the GNSS-cellular time relationship, a GNSS time; and
obtain, based on the GNSS time and GNSS satellite positioning signals, a second GNSS fix.

10. The mobile device of claim 9, wherein the processor is further configured to:
start a GNSS timer in response to reception of the second pulse, wherein to determine the GNSS time is further based on the GNSS timer.

11. The mobile device of claim 9, wherein the processor is further configured to:
determine that the GNSS-cellular time relationship is to be generated; and
in response to the determination that the GNSS-cellular time relationship is desired, request the first pulse from the cellular modem.

12. The mobile device of claim 11, wherein the processor is further configured to:
in response to the determination that the second GNSS fix is to be generated and the determination that the GNSS signal from the plurality of satellites is too weak to extract the TOW information, request the second pulse from the cellular modem.

13. The mobile device of claim 11, wherein, to request the first pulse from the cellular modem, the processor is further configured to:
request a plurality of periodic pulses, wherein to request the plurality of periodic pulses includes specifying at least one of a number of the plurality of periodic pulses or a periodicity of transmission of the plurality of periodic pulses.

14. The mobile device of claim 13, wherein the processor is further configured to:
indicate to the cellular modem to terminate transmission of the plurality of periodic pulses.

15. The mobile device of claim 9, wherein the first pulse timing information is indicated in the first pulse.

16. The mobile device of claim 9, wherein the first pulse timing information is indicated in a message separate from the first pulse.

17. A non-transitory memory medium of a mobile device comprising:
program instructions, the program instructions configured to cause a processor executing the program instructions to:
at a first time:
obtain a first Global Navigation Satellite System (GNSS) fix, wherein the first GNSS fix is based on satellite positioning signals received from a plurality of satellites;
determine a first GNSS fix time of the first GNSS fix;
receive, from a cellular modem of the mobile device, a first pulse and first pulse timing information of the first pulse, the first pulse timing information indicating a first pulse time in cellular network time; and
determine, based on the first pulse time in cellular network time and the first GNSS fix time, a GNSS-cellular time relationship; and
at a second time, subsequent to the first time:
determine that a GNSS signal from the plurality of satellites is too weak to extract time of week (TOW) information;
in response to the determination that the GNSS signal from the plurality of satellites is too weak to extract the TOW information, request, from the cellular modem of the mobile device, a second pulse;
receive, from the cellular modem of the mobile device, the second pulse and second pulse timing information of the second pulse, the second pulse timing information indicating a second pulse time in cellular network time, wherein the second pulse timing information is based on:
cumulative cell switching time offsets of inter- and intra-radio access technology (RAT) transitions of the mobile device since an immediately preceding pulse; and
a cumulative number of frame wraparounds for each RAT;
determine, based on the second pulse time and the GNSS-cellular time relationship, a GNSS time; and
obtain, based on the GNSS time and GNSS satellite position signals, a second GNSS fix.

18. The non-transitory memory medium of claim 17, wherein the program instructions further cause the processor to:
start a GNSS timer in response to reception of the second pulse, wherein to determine the GNSS time is further based on the GNSS timer.

19. The non-transitory memory medium of claim 17, wherein the program instructions further cause the processor to:
determine that the GNSS-cellular time relationship is to be generated; and
in response to the determination that the second GNSS fix is to be generated and the determination that the GNSS signal from the plurality of satellites is too weak to extract the TOW information, request the first pulse from the cellular modem.

20. The non-transitory memory medium of claim 19, wherein, to request the first pulse from the cellular modem, the program instructions further cause the processor to:
request a plurality of periodic pulses, wherein to request the plurality of periodic pulses includes specifying at least one of a number of the plurality of periodic pulses or a periodicity of transmission of the plurality of periodic pulses.

21. The non-transitory memory medium of claim 20, wherein the program instructions further cause the processor to:
indicate to the cellular modem to terminate transmission of the plurality of periodic pulses.

22. The non-transitory memory medium of claim 17, wherein the first pulse timing information is indicated in the first pulse.

23. The non-transitory memory medium of claim 17, wherein the first pulse timing information is indicated in a message separate from the first pulse.

24. A method for operating a mobile device, the method comprising:
at the mobile device:
at a first time:
obtaining a first Global Navigation Satellite System (GNSS) fix, wherein the first GNSS fix is based on satellite positioning signals received from a plurality of satellites;
determining a first GNSS fix time of the first GNSS fix;
receiving; from a cellular modem of the mobile device, a first pulse and first pulse timing information of the first pulse, the first pulse timing information indicating a first pulse time in cellular network time; and
determining, based on the first pulse time cellular network time and the first GNSS fix time, a GNSS-cellular time relationship; and
at a second time, subsequent to the first time:
determining that a GNSS signal from the plurality of satellites is too weak to extract time of week (TOW) information;
in response to the determination that the GNSS signal from the plurality of satellites is too weak to extract the TOW information, requesting, from the cellular modem of the mobile device, a second pulse;
receiving, from the cellular modem of the mobile device, the second pulse and second pulse timing information of the second pulse, the second pulse timing information indicating a second pulse time in cellular network time, wherein the second pulse timing information is based on:
cumulative cell switching time offsets of inter- and intra-radio access technology (RAT) transitions of the mobile device since an immediately preceding pulse; and
a cumulative number of frame wraparounds for each RAT;
determining, based on the second pulse time and the GNSS-cellular time relationship, a GNSS time; and
obtaining, based on the GNSS time and GNSS satellite positioning signals, a second GNSS fix.

25. The method of claim 24, the method further comprising:
starting a GNSS timer in response to reception of the second pulse, wherein to determine the GNSS time is further based on the GNSS timer.

26. The method of claim 24, wherein the first pulse is one of a plurality of periodic pulses, the method further comprising:
indicating to the cellular modem to terminate transmission of the plurality of periodic pulses.

27. The method of claim 24, wherein thy: first pulse timing information is indicated in the first pulse.

28. The method of claim 24, wherein the first pulse timing information is indicated in a message separate from the first pulse.

29. The apparatus of claim 1, wherein the second pulse timing information is an absolute reference time (AbsTime) generated by:

$$AbsTime = F_m + \sum_{r=1}^{R}\left[dT_r + n_r f_r + \sum_{n=1}^{N} dT_{nr}\right].$$

where:
$F_m$ is a current reference time, R is a number of intra-RAT changes, N is a number of inter-RAT changes, $n_r$ is a number of frame wraparounds, $f_r$ is a time of 1 wraparound, $dT_{nr}$ is a time offset for intra-RAT changes, and $dT_r$ is a time offset of inter-RAT changes.

* * * * *